United States Patent
Shamoto et al.

(10) Patent No.: US 12,172,220 B2
(45) Date of Patent: *Dec. 24, 2024

(54) CUTTING INSERT AND CUTTING TOOL

(71) Applicants: NATIONAL UNIVERSITY CORPORATION TOKAI NATIONAL HIGHER EDUCATION AND RESEARCH SYSTEM, Nagoya (JP); NTK CUTTING TOOLS CO., LTD., Komaki (JP)

(72) Inventors: Eiji Shamoto, Nagoya (JP); Takashi Ueda, Nagoya (JP)

(73) Assignees: NATIONAL UNIVERSITY CORPORATION TOKAI NATIONAL HIGHER EDUCATION AND RESEARCH SYSTEM, Nagoya (JP); NTK CUTTING TOOLS CO., LTD., Komaki (JP)

( * ) Notice: Subject to any disclaimer, the term of this patent is extended or adjusted under 35 U.S.C. 154(b) by 632 days.

This patent is subject to a terminal disclaimer.

(21) Appl. No.: 17/429,018

(22) PCT Filed: Feb. 7, 2020

(86) PCT No.: PCT/JP2020/004701
§ 371 (c)(1),
(2) Date: Aug. 6, 2021

(87) PCT Pub. No.: WO2020/162581
PCT Pub. Date: Aug. 13, 2020

(65) Prior Publication Data
US 2022/0105573 A1 Apr. 7, 2022

(30) Foreign Application Priority Data
Feb. 8, 2019 (JP) .................................. 2019-021386

(51) Int. Cl.
B23B 27/10 (2006.01)
B23B 27/16 (2006.01)

(52) U.S. Cl.
CPC ............ B23B 27/10 (2013.01); B23B 27/164 (2013.01); *B23B 2205/16* (2013.01)

(58) Field of Classification Search
CPC ................ B23B 27/10; B23B 2200/12; B23B 2200/128; B23C 5/28; B23C 2200/12; B23C 2200/128
See application file for complete search history.

(56) References Cited

U.S. PATENT DOCUMENTS 3,077,802 A 2/1963 Philip
3,889,520 A * 6/1975 Stoferle ............. B23Q 17/0928
73/104

(Continued)

FOREIGN PATENT DOCUMENTS

EP 0 100 376 A2 2/1984
FR 1593553 A 6/1970

(Continued)

OTHER PUBLICATIONS

Extended European Search Report issued Oct. 17, 2022 in European Application No. 20752480.2.

(Continued)

*Primary Examiner* — Nicole N Ramos
(74) *Attorney, Agent, or Firm* — Sughrue Mion, PLLC

(57) ABSTRACT

A structure for cooling a rake face of a cutting insert in a region near a tip of a cutting edge. The cutting insert includes a rake face, a cutting edge formed on an outer periphery of the rake face, a base portion that supports the rake face, and an internal cooling path through which fluid for cooling the rake face flows. The internal cooling path includes an introduction flow path and a cooling flow path, (Continued)

and the cooling flow path is disposed behind a region in which a chip of a workpiece comes into contact with rake face. The cooling flow path is provided at a depth of less than or equal to 1.5 mm from the rake face.

10 Claims, 8 Drawing Sheets

(56) References Cited

U.S. PATENT DOCUMENTS

| | | | |
|---|---|---|---|
| 4,535,216 A * | 8/1985 | Cassidenti | B23B 27/10 82/51 |
| 6,053,669 A | 4/2000 | Lagerberg | |
| 6,637,984 B2 | 10/2003 | Murakawa et al. | |
| 7,634,957 B2 | 12/2009 | Ghosh et al. | |
| 7,802,947 B2 * | 9/2010 | Endres | B23B 27/145 407/115 |
| 7,955,032 B2 * | 6/2011 | Nelson | B23C 5/28 407/113 |
| 7,963,729 B2 | 6/2011 | Prichard et al. | |
| 7,997,832 B2 | 8/2011 | Prichard et al. | |
| 8,079,783 B2 | 12/2011 | Prichard et al. | |
| 8,079,784 B2 | 12/2011 | Prichard et al. | |
| 8,328,471 B2 | 12/2012 | Nelson et al. | |
| 8,439,608 B2 | 5/2013 | Chen et al. | |
| 8,701,529 B2 * | 4/2014 | Deschenaux | B23B 29/043 407/113 |
| 8,727,673 B2 | 5/2014 | Hoffer et al. | |
| 10,007,246 B2 * | 6/2018 | Grant | B23Q 11/1053 |
| 11,554,427 B2 | 1/2023 | Hirano et al. | |
| 2001/0007215 A1 * | 7/2001 | Murata | B23B 27/10 83/16 |
| 2002/0106250 A1 | 8/2002 | Murakawa et al. | |
| 2006/0053987 A1 | 3/2006 | Ghosh et al. | |
| 2008/0175676 A1 | 7/2008 | Prichard et al. | |
| 2008/0175679 A1 | 7/2008 | Prichard et al. | |
| 2008/0279644 A1 | 11/2008 | Endres | |
| 2009/0320655 A1 | 12/2009 | Grant | |
| 2011/0020072 A1 | 1/2011 | Chen et al. | |
| 2011/0027021 A1 | 2/2011 | Nelson et al. | |
| 2011/0027023 A1 | 2/2011 | Prichard et al. | |
| 2011/0027024 A1 | 2/2011 | Prichard et al. | |
| 2011/0033250 A1 | 2/2011 | Prichard et al. | |
| 2011/0229277 A1 | 9/2011 | Hoffer et al. | |
| 2012/0082518 A1 * | 4/2012 | Woodruff | B23P 15/34 76/115 |
| 2016/0158855 A1 * | 6/2016 | Kondameedi | B23C 5/28 407/11 |
| 2018/0154465 A1 | 6/2018 | Kondameedi et al. | |
| 2020/0215618 A1 | 7/2020 | Hirano et al. | |

FOREIGN PATENT DOCUMENTS

| | | |
|---|---|---|
| JP | 59-42205 A | 3/1984 |
| JP | 63-151203 U | 10/1988 |
| JP | 5-301104 A | 11/1993 |
| JP | 08039387 A * | 2/1996 |
| JP | 2006-88297 A | 4/2006 |
| JP | 2006-102932 A | 4/2006 |
| JP | 2010-516484 A | 5/2010 |
| JP | 2013-49106 A | 3/2013 |
| JP | 5950240 B2 | 7/2016 |
| JP | 2019-18294 A | 2/2019 |
| WO | 01/064376 A1 | 9/2001 |
| WO | 2019/017064 A1 | 1/2019 |

OTHER PUBLICATIONS

Okamoto et al., "On Cutting with Internally Cooled Cutting Tool (1st Report)", Journal of Japan Society of Precision Engineering, 1972, vol. 38, Issue 448, pp. 443-448, Abstract Only (1 page).
International Search Report issued Mar. 31, 2020 in International Application No. PCT/JP2020/004701.
International Preliminary Report on Patentability issued Apr. 26, 2021 in International Application No. PCT/JP2020/004701.
Office Action dated Feb. 21, 2023 from the Japanese Patent Office in JP Application No. 2019-021386.

* cited by examiner

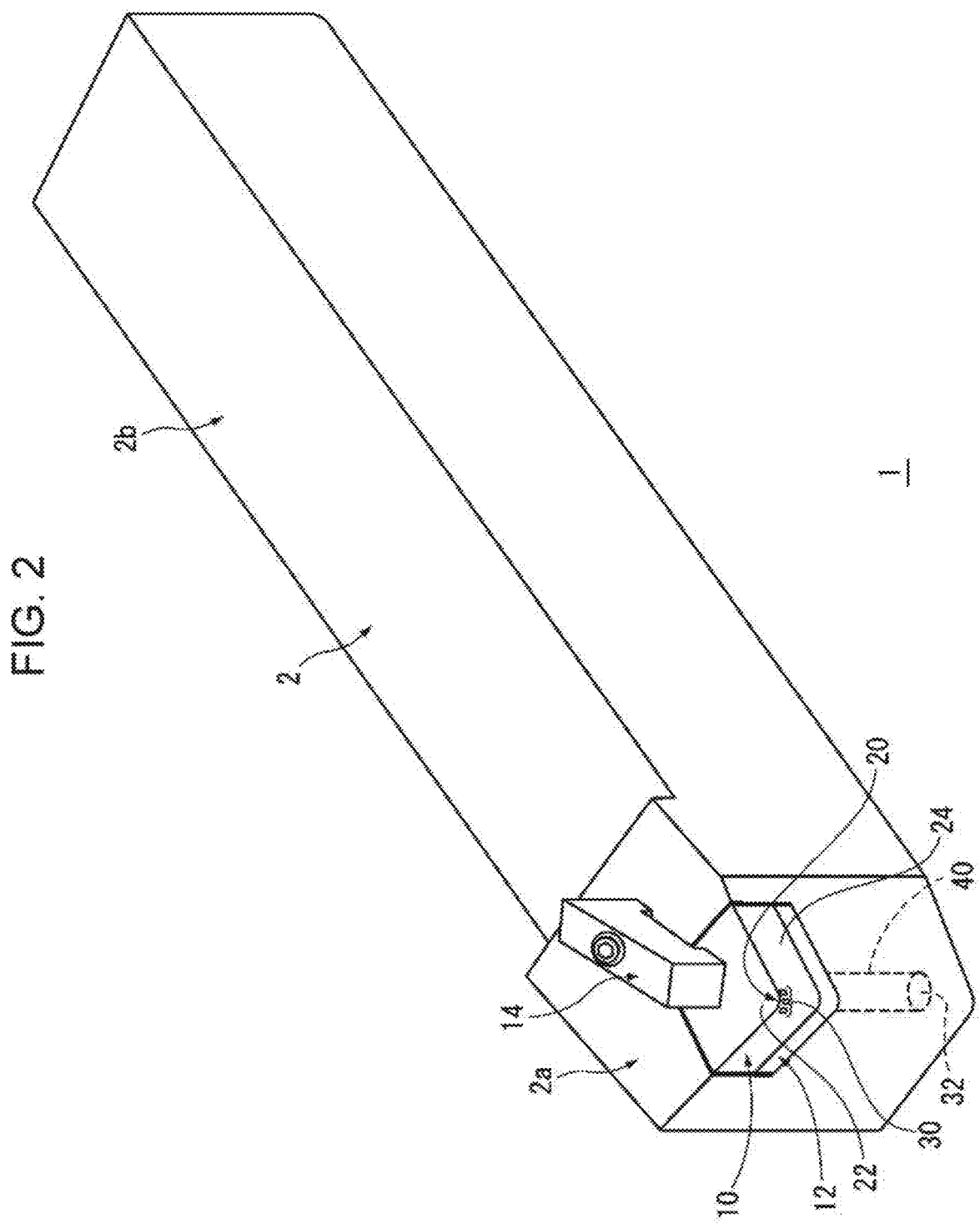

CUTTING INSERT AND CUTTING TOOL

CROSS-REFERENCE TO RELATED APPLICATIONS

This application is a National Stage of International Application No. PCT/JP2020/004701 filed on Feb. 7, 2020, which claims priority under U.S.C. § 119 (a) to Japanese Patent Application No. 2019-021386 filed on Feb. 8, 2019.

TECHNICAL FIELD

The present disclosure relates to a cutting insert and a cutting tool. This application is based on and claims the benefit of priority of Japanese Patent Application No. 2019-021386 filed on Feb. 8, 2019, the entire contents of which are incorporated by reference in this specification.

BACKGROUND ART

It has been known that frictional heat and shearing heat generated in a cutting process cause an increase in the temperature of a tip of a cutting edge of a tool and that thermal wear is caused as a result. During the cutting process, cutting oil is supplied to the tip of the cutting edge of the tool to absorb the frictional heat and shearing heat that are generated. However, since a chip is in contact with a rake face of the tool in a region near the tip of the cutting edge, where the temperature is highest, the cutting oil does not reach this region. Thus, the temperature cannot be easily sufficiently reduced in the contact region.

NPL 1 discloses a cooled cutting device in which a tip of a cutting edge of a tool is attached to a shank having a through hole and which includes a circulation circuit for causing coolant to flow from a cooling tank, pass through the through hole in the shank, and then return to the cooling tank.

CITATION LIST

Non Patent Literature

NPL 1: Sadaji Okamoto et al., "On Cutting with Internally Cooled Cutting Tool (1st Report)", Journal of the Japan Society of Precision Engineering, May 1972, Vol. 38, No. 5

SUMMARY OF INVENTION

Technical Problem

NPL 1 discloses a structure in which a tip of a cutting edge of a tool is cooled through a cooled shank. However, a portion of a rake face in a region near the tip of the cutting edge, where the temperature is highest, is away from the through hole in the shank through which the coolant passes, and therefore cannot be efficiently cooled.

The present disclosure has been made in light of the above-described circumstances, and provides a structure for cooling a rake face in a region near a tip of a cutting edge.

Solution to Problem

To solve the above-described problem, a cutting insert according to an aspect of the present invention includes a rake face, a cutting edge formed on an outer periphery of the rake face, a base portion that supports the rake face, and an internal cooling path through which fluid for cooling the rake face flows.

A cutting tool according to another aspect of the present invention includes a tool body, a cutting insert including an internal cooling path, and a supply hole through which fluid is supplied to the internal cooling path.

Advantageous Effects of Invention

The present disclosure provides a structure for cooling a rake face in a region near a tip of a cutting edge.

BRIEF DESCRIPTION OF DRAWINGS

FIG. 2 is a schematic diagram illustrating the structure of a cutting tool according to an embodiment.

DESCRIPTION OF EMBODIMENTS

Figure 1A:
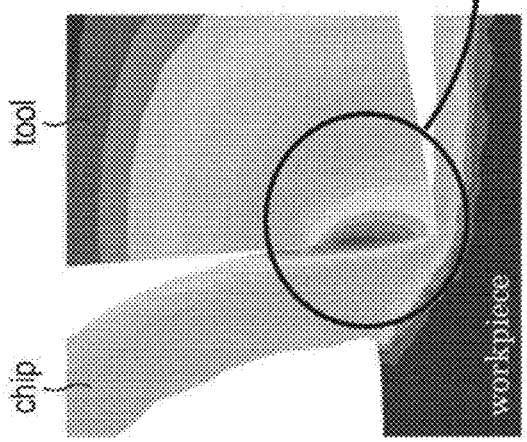
FIGS. 1A and 1B illustrate the result of analysis of temperature distribution.

As illustrated in FIG. 1A, a chip comes into contact with a rake face in a region near the tip of the cutting edge immediately after being cut. As can be observed, frictional heat and shearing heat are transmitted from the chip to the rake face in the region near the tip of the cutting edge, and accordingly, the temperature in this region exceeds the temperature at the tip of the cutting edge. The analysis result shows that the highest temperature of the rake face is close to 1000 degrees. When the temperature is increased to around 1000 degrees, thermal wear may occur even in an insert made of a super-hard alloy having high strength at high temperatures.

Before describing an embodiment of the present disclosure, an increase in the temperature of a rake face in a region near a tip of a cutting edge will be described.

Figure 1B:
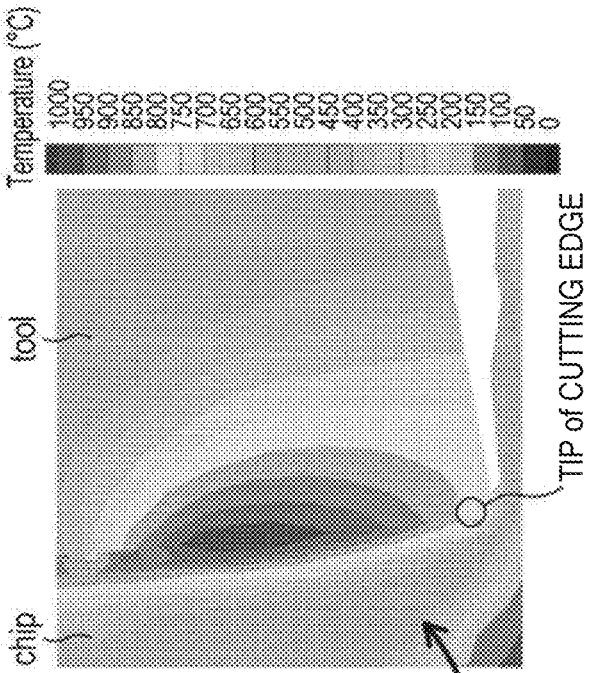

FIG. 1A illustrates the result of analysis of temperature distribution when a workpiece is being cut by a tool. FIG. 1B is an enlarged view of the result of analysis of the temperature distribution illustrating a region including a tip of a cutting edge.

The analysis result shows that the highest temperature is approximately 1000 degrees and that the temperature drops to around 200 degrees at a location away from the tip of the cutting edge by about 5 times the cutting thickness of the workpiece (cutting depth in two-dimensional cutting). This is because the location is sufficiently away from the region in which the chip is in contact with the rake face. Therefore, it is clear from the analysis result that a region near the contact region needs to be cooled. Since the cutting thickness is in the range of about several tens of micrometers to about three hundred micrometers under many practical cutting conditions, a region in a range of less than or equal to 1.5 mm from the tip of the cutting edge needs to be cooled.

It is known that the contact length between the rake face and the chip correlates with the cutting thickness of the workpiece. The correlation also depends on the cutting speed, the shape of the tip of the cutting edge of the tool, etc. to be precise. However, under practical conditions, the contact length between the rake face and the chip is less than or equal to several times the cutting thickness, as in the example illustrated in FIGS. 1A and 1B. Since the cutting thickness is in the range of about several tens of micrometers to about three hundred micrometers under many practical cutting conditions, it can be assumed that the contact length falls within 1.5 mm. An embodiment of the present disclosure will now be described based on the above discussion.

FIG. 2 is a schematic diagram illustrating the structure of a cutting tool according to the embodiment. A cutting tool 1 includes a shank 2 made of a steel material. The shank 2 is a tool body, and includes a shank end portion 2a to which a cutting insert 10 is attached and a held portion 2b which is held by a machine tool in a cutting process. The shank end portion 2a has a top surface which is formed one step higher than a top surface of the held portion 2b. An end portion of the top surface of the shank end portion 2a has a cutout portion to which the cutting insert 10 and a sheet member 12 are attached.

The cutting insert 10 and the sheet member 12, which are made of a hard material, such as a super-hard alloy, are disposed in the cutout portion and fixed to the shank 2 by a clamp member 14. The cutting insert 10 and the sheet member 12 may instead be fixed to the shank 2 by other means. For example, the cutting insert 10 and the sheet member 12 may have screw holes that extend therethrough, and be directly fixed to the shank 2 by a screw member. The cutting insert 10 may instead be directly fixed to the cutout portion of the shank end portion 2a without having the sheet member 12 disposed therebetween.

Figure 3:
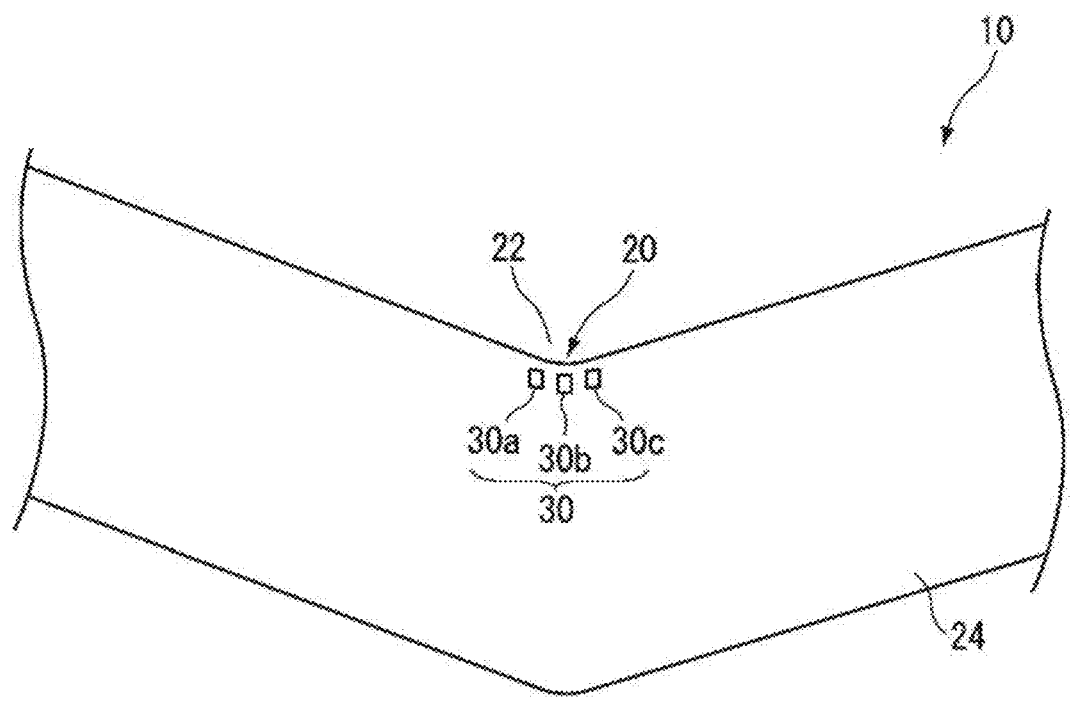
FIG. 3 is an enlarged view of a region including a cutting edge.

FIG. 3 is an enlarged view of a region including a cutting edge of the cutting insert 10. The cutting insert 10 includes a rake face 22, cutting edges 20 formed on the outer periphery of the rake face 22, and a base portion 24 which supports the rake face 22. The cutting insert 10 according to the embodiment includes two cutting edges 20 at diagonal corners of the rake face 22, but may instead include the cutting edges 20 at all of the corners.

The base portion 24, the sheet member 12, and the shank end portion 2a are provided with an internal cooling path 40 through which fluid for cooling the rake face 22 flows. The cooling fluid supplied to the internal cooling path 40 may be liquid, such as water-soluble cutting oil or water-insoluble cutting oil, but may instead be gas, such as cooling air. The cutting tool 1 is formed such that a supply hole 32, which serves as an inlet of the internal cooling path 40, is formed in a bottom surface of the shank end portion 2a, and such that a plurality of flow-path openings 30a, 30b, and 30c (hereinafter referred to also as "flow-path openings 30" without distinction), which serve as outlets of the internal cooling path 40, are formed in flank faces of the base portion 24 of the cutting insert 10 in a region near the cutting edge 20. The internal cooling path 40 includes an introduction flow path and cooling flow paths. The introduction flow path extends from the supply hole 32 to a location immediately below the rake face 22 through the interior of the shank end portion 2a and the sheet member 12. The cooling flow paths extend behind the rake face 22 and parallel to the rake face 22 to the flow-path openings 30. In the embodiment, the expression "parallel to the rake face 22" may include any substantially parallel state that does not deviate from the intended purpose.

Figure 4:
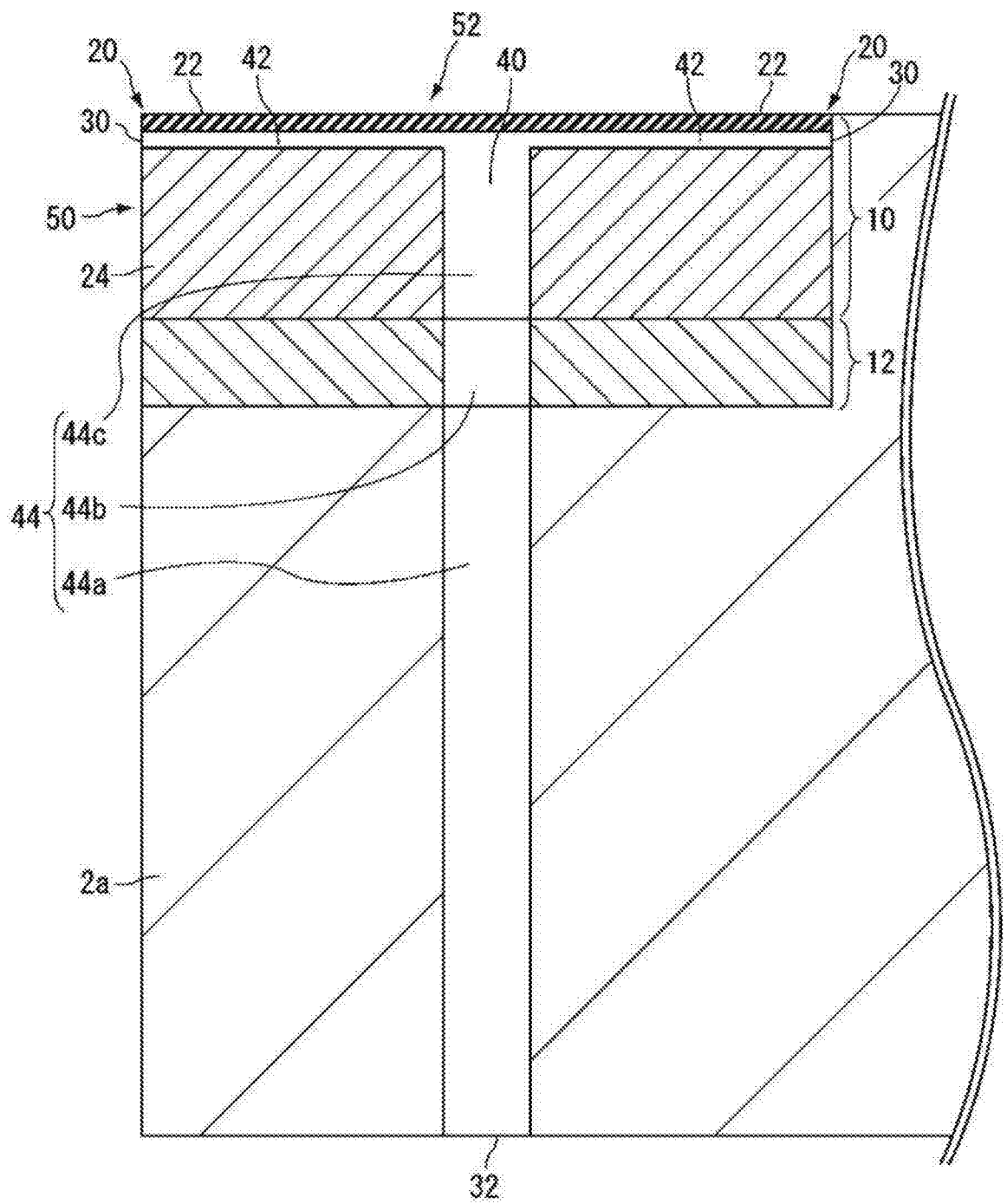
FIG. 4 is a sectional view of the cutting tool.

FIG. 4 is a sectional view of the cutting tool 1 taken along a diagonal of the rake face 22 on which the pair of cutting edges 20 are provided. The clamp member 14 is not illustrated. The internal cooling path 40 includes an introduction flow path 44 which extends from the supply hole 32 to the location immediately below the rake face 22 and cooling flow paths 42 which extend parallel to the rake face 22 from the end of the introduction flow path 44 to the flow-path openings 30.

The introduction flow path 44 includes a first introduction flow path 44a formed in the shank end portion 2a, a second introduction flow path 44b formed in the sheet member 12, and a third introduction flow path 44c formed in the base portion 24 of the cutting insert 10. The introduction flow path 44 illustrated in FIG. 4 extends linearly in a direction perpendicular to the bottom surface of the shank end portion 2a. However, the first introduction flow path 44a may instead be bent so that the supply hole 32 is formed in a side surface of the shank end portion 2a. The supply hole 32 is preferably formed at a location such that the cooling fluid can be easily supplied by a machine tool. To prevent leakage of the cooling fluid, abutting surfaces of the components may be sealed.

The cooling flow paths 42 are formed as groove-shaped flow paths that extend parallel to the rake face 22. The cooling flow paths 42 are provided at least behind the region in which the chip of the workpiece comes into contact with the rake face 22. The cooling flow paths 42 have a function of causing the cooling fluid supplied from the supply hole 32 through the introduction flow path 44 to flow along the rake face 22 toward the flow-path openings 30 formed immediately below the cutting edges 20, thereby cooling the rake face 22 in the regions near the cutting edges 20.

The cutting insert 10 of the embodiment includes a thin plate member 52 having a top surface that serves as the rake face 22 and a base body 50 which supports the thin plate member 52 and constitutes the base portion 24. The cooling flow paths 42 are formed by bringing a bottom surface (back surface) of the thin plate member 52 into contact with a top surface of the base body 50.

Figure 5A:
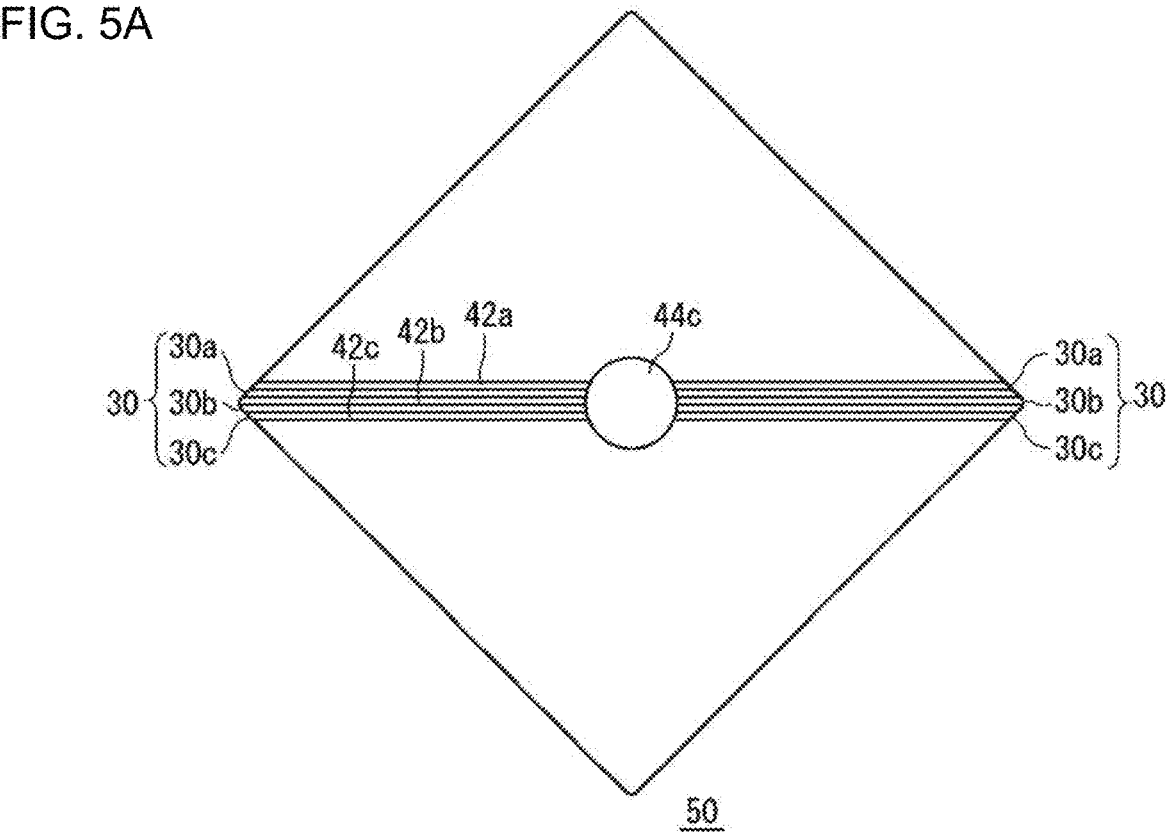
FIGS. 5A and 5B illustrate the structure of a base body.
Figure 5B:
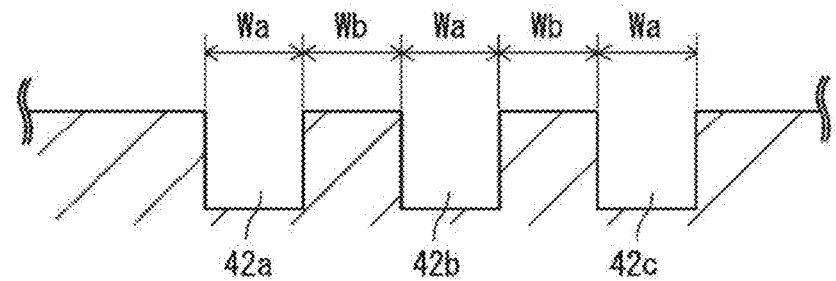

FIG. 5A illustrates the top surface of the base body 50, and FIG. 5B is a partial sectional view of the top surface. The top surface of the base body 50 has a plurality of cooling flow paths 42a, 42b, and 42c (hereinafter referred to also as "cooling flow paths 42" without distinction) which extend parallel to each other and along which the cooling fluid flows. The cooling flow paths 42 extend at least over a range from the position of the cutting edge 20 on the rake face 22 to a region in which the chip comes into contact with the rake face 22. As described above, under practical conditions, the contact length between the chip and the rake face 22 falls within 1.5 mm from the tip of the cutting edge. Therefore, the cooling flow paths 42 may be provided over a range of about 1.5 mm from the tip of the cutting edge 20. In the embodiment, the cooling flow paths 42 are formed to extend from the upper end of the third introduction flow path 44c toward the corners corresponding to the positions of the cutting edges 20 on the rake face 22.

Figure 6A:
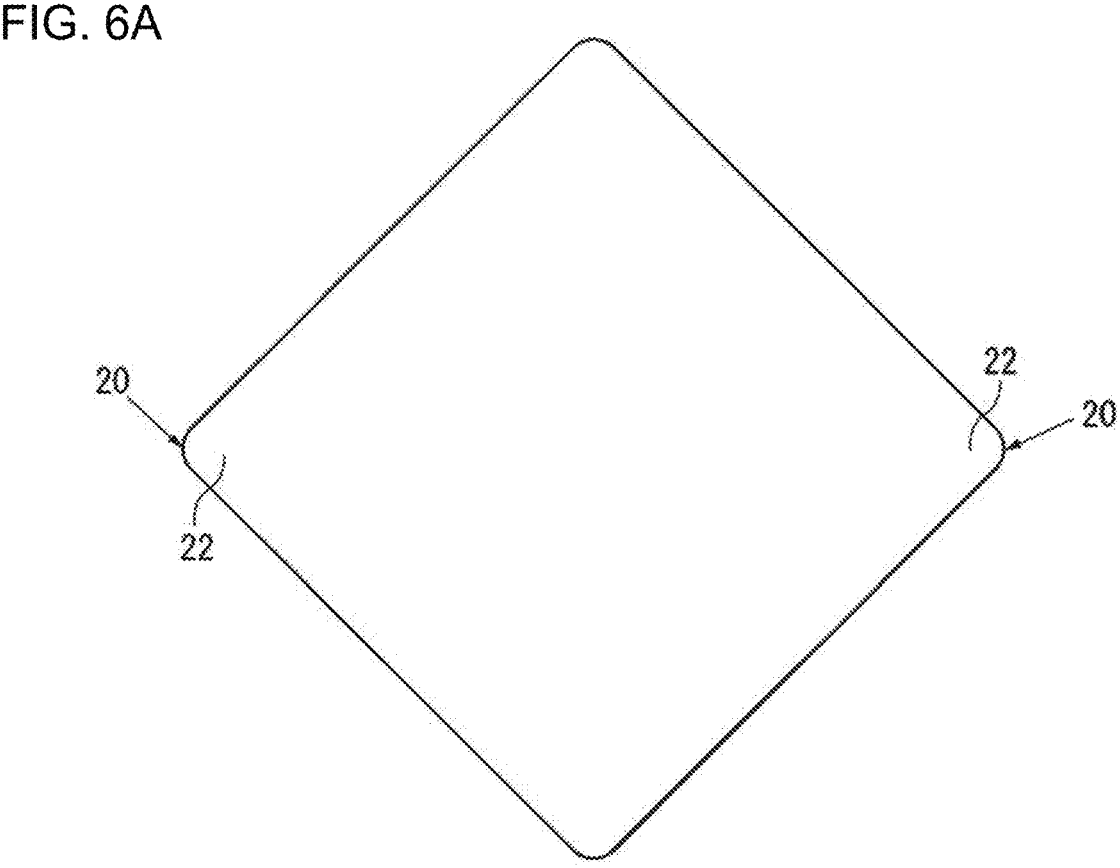
FIGS. 6A and 6B illustrate the structure of a thin plate member.
Figure 6B:
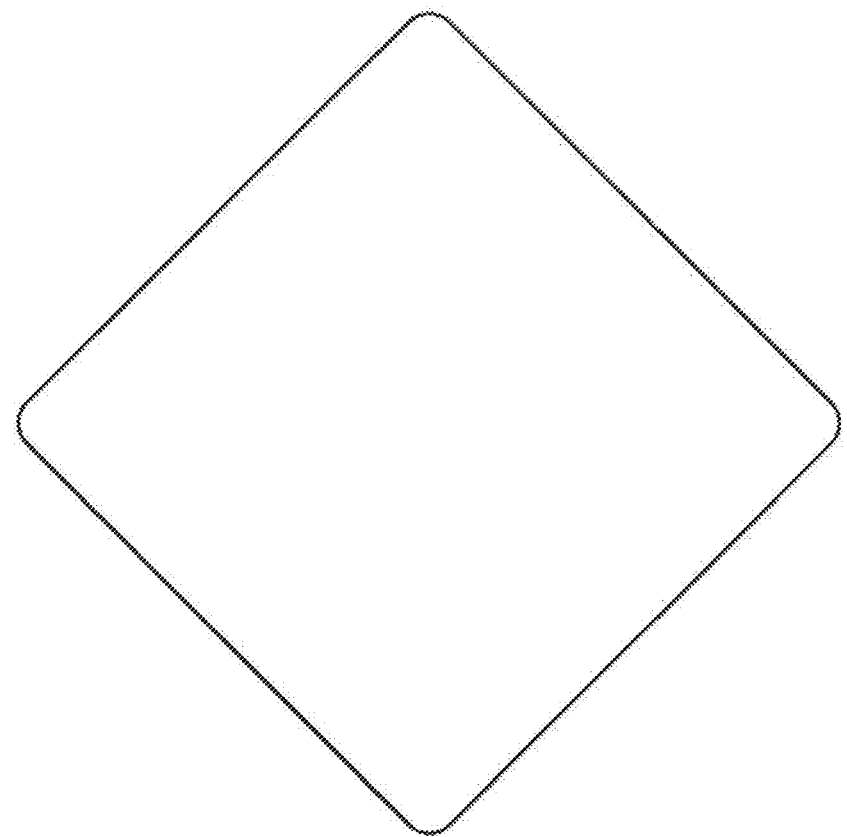

FIG. 6A illustrates a top surface of the thin plate member 52, and FIG. 6B illustrates the bottom surface of the thin plate member 52. The top surface of the thin plate member 52 serves as the rake face 22, and the cutting edges 20 are formed on the outer periphery of the rake face 22. The bottom surface of the thin plate member 52 is placed on the top surface of the base body 50, so that the cooling flow paths 42 are formed between the base body 50 and the bottom surface of the thin plate member 52.

To increase the cooling efficiency, the cooling flow paths 42 are preferably provided at a depth that is less than or equal to 1.5 mm from the rake face 22. In the embodiment, the depth of the cooling flow paths 42 from the rake face 22 is defined as the distance between the top surface of each cooling flow path 42 and the rake face 22, and is therefore equal to the thickness of the thin plate member 52. To ensure sufficient strength of the thin plate member 52 and increase the efficiency in cooling the thin plate member 52, the depth of the cooling flow paths 42 from the rake face 22, that is, the thickness of the thin plate member 52, is preferably set in the range of 0.2 mm or more and 1.5 mm or less, more preferably in the range of 0.2 mm or more and 1 mm or less, and still more preferably in the range of 0.2 mm or more and 0.5 mm or less.

The thin plate member 52 is made of a super-hard alloy having a low toughness. Therefore, when the cooling flow paths 42 have a width Wa greater than the above-described depth, there is a possibility that the thin plate member 52 will break. Therefore, the flow-path width Wa is set to be less than or equal to a predetermined length. More specifically, the flow-path width Wa is preferably less than or equal to the depth. To prevent breakage of the thin plate member 52, the ratio of the flow-path width Wa to a distance Wb between the flow paths (Wa/Wb) is preferably set to be less than or equal to 1.

Since the cutting insert 10 is composed of two members, which are the base body 50 and the thin plate member 52, the cutting insert 10 can be easily manufactured. In addition, when the flow-path openings 30 are clogged with chips, the chips can be easily removed by separating the thin plate member 52 from the base body 50. In addition, when the cutting edges 20 are worn, only the thin plate member 52 needs to be replaced, and the base body 50 can be reused.

The present disclosure has been described based on the embodiment. It is to be understood by a person skilled in the art that the embodiment is illustrative, that various modifications are possible with regard to combinations of the components and processes in the embodiment, and that such modifications are also included in the scope of the present disclosure.

Although the cooling flow paths 42 are formed in the top surface of the base body 50 in the embodiment, the cooling flow paths 42 may instead be formed in the bottom surface of the thin plate member 52. Alternatively, the cooling flow paths 42 may be formed in both the top surface of the base body 50 and the bottom surface of the thin plate member 52. In addition, although the introduction flow path 44 is formed also in the sheet member 12 and the shank end portion 2a in the embodiment, the third introduction flow path 44c may be omitted, and the cooling fluid may be supplied from the flow-path openings 30 near the other cutting edge 20.

Figure 7:
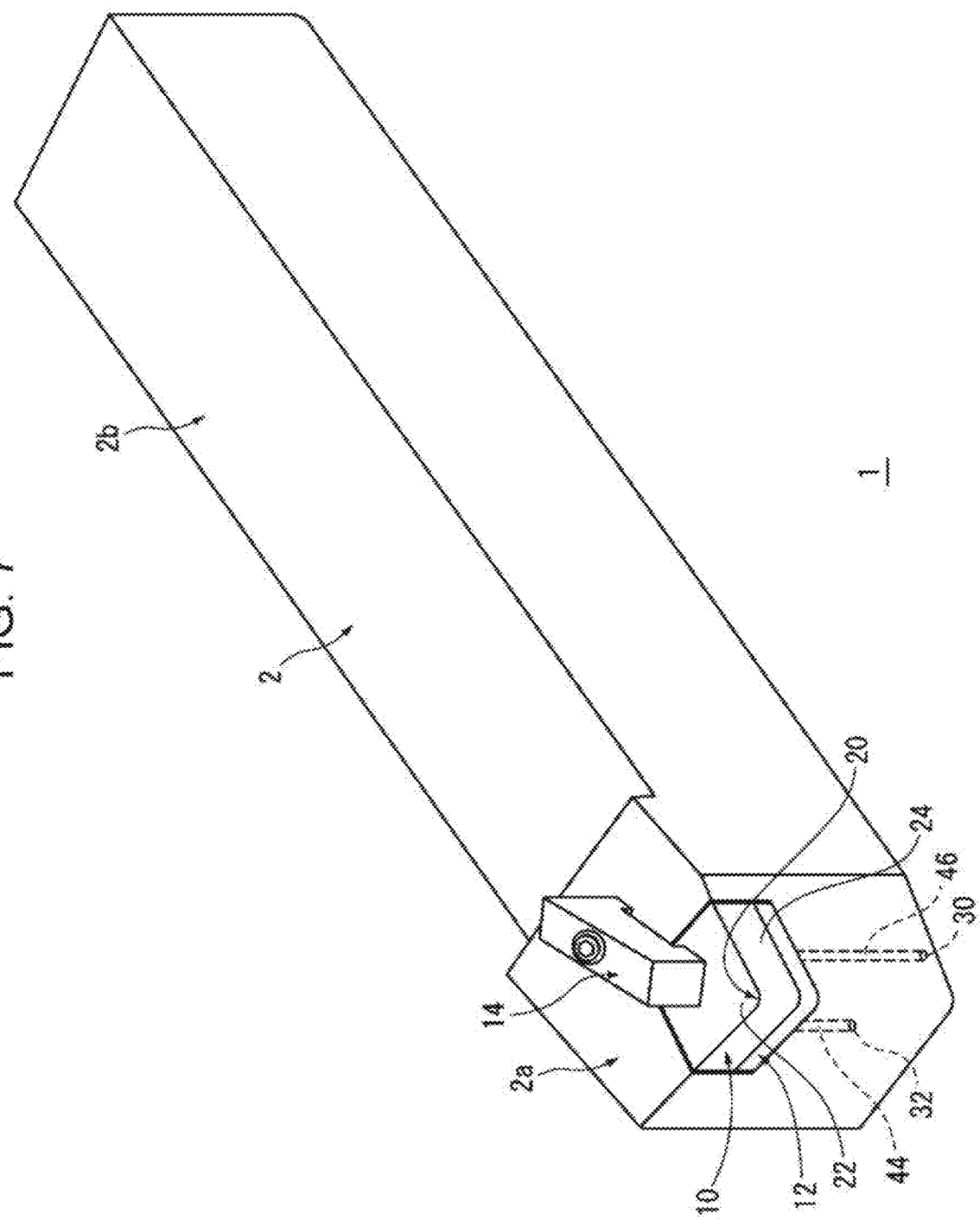
FIG. 7 illustrates a section of a cutting tool according to a modification.
Figure 8:
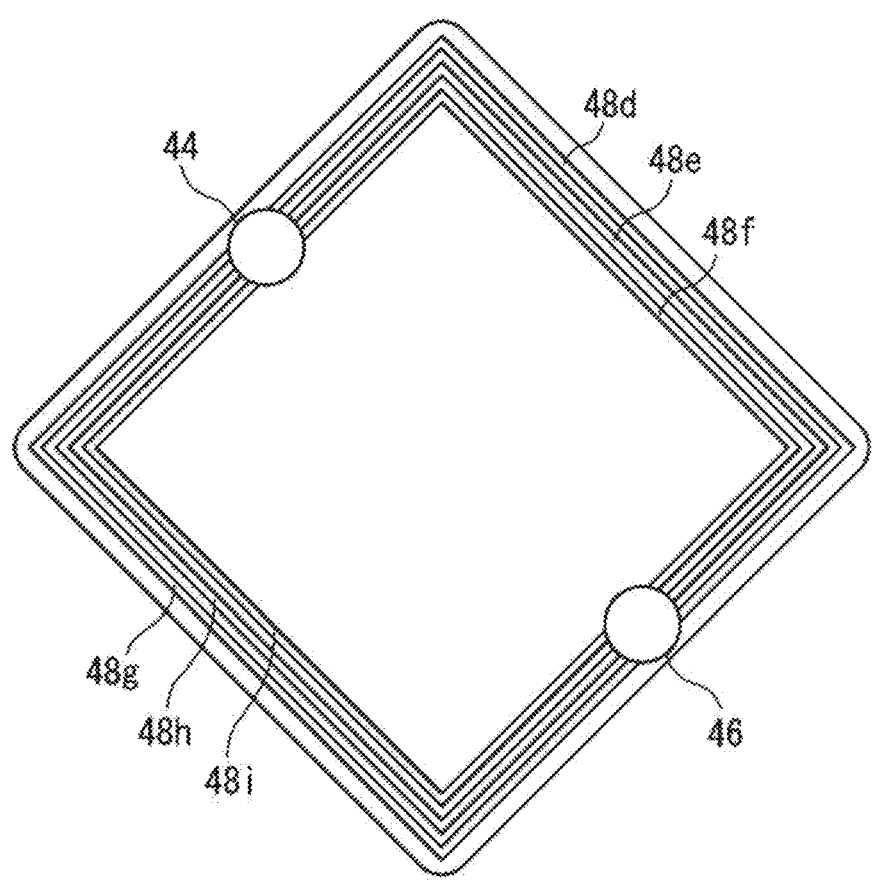
FIG. 8 illustrates a top surface of a base body.

FIG. 7 a schematic diagram illustrating the structure of a cutting tool according to a modification. FIG. 8 is a top surface of a base body 50 according to the modification. The cooling structure illustrated in FIG. 4 discharges the cooling fluid from the flow-path openings 30 disposed immediately below the cutting edges 20. In contrast, the cooling structure illustrated in FIG. 7, which is applicable to dry processing, discharges the cooling fluid from a flow-path opening 30 formed in the bottom surface of the shank end portion 2a.

According to the modification, an internal cooling path includes an introduction flow path 44 which extends from a supply hole 32 to a location immediately below a rake face 22; cooling flow paths 48d, 48e, 48f, 48g, 48h, and 48i (hereinafter referred to as "cooling flow paths 48") which extend parallel to the rake face 22 from the end of the introduction flow path 44; and a discharge flow path 46 which extends from a location immediately below the rake face 22 to the flow-path opening 30. As illustrated in FIG. 7, the supply hole 32 which serves as an inlet of the internal cooling path 40 and the flow-path opening 30 which serves as an outlet of the internal cooling path 40 are formed in the bottom surface of the shank end portion 2a.

The cooling flow paths 48 are formed as groove-shaped flow paths that extend parallel to the rake face 22, and the cooling flow paths 48 are provided at least behind a region in which the chip of the workpiece comes into contact with the rake face 22. The cooling flow paths 48 have a function of causing the cooling fluid supplied from the supply hole 32 through the introduction flow path 44 to flow along the rake face 22 toward the discharge flow path 46 so as to pass through regions near the cutting edges 20, thereby cooling the rake face 22 in the regions near the cutting edges 20. In this modification, the cutting edges 20 may be formed at four corners of the rake face 22.

Based on the assumption that the contact length between the chip and the rake face 22 falls within 1.5 mm from the tip of the cutting edge, the cooling flow paths 48 which extend parallel to each other are preferably provided to cover a range of within 1.5 mm from the tip of the cutting edge 20.

In the examples illustrated in FIGS. 4 and 7, the cutting insert 10 is composed of two members, which are the base body 50 and the thin plate member 52. However, the cutting insert 10 may instead have an integral structure. For example, when the cutting insert is manufactured by sintering, super-hard alloy powder may be compression-molded while a low-melting-point material having the shape of an internal cooling path is embedded therein. Then, the super-hard alloy powder may be sintered at a high temperature so that the low-melting-point material is eluted and the internal cooling path is formed.

Although the shank 2 is described as a tool body of the cutting tool 1 in the embodiment, the cutting tool 1 is not limited to a turning tool, and may instead be a milling tool having a cutter body.

Aspects of the present disclosure will now be described. A cutting insert according to an aspect of the present disclosure includes a rake face, a cutting edge formed on an outer periphery of the rake face, a base portion that supports the rake face, and an internal cooling path through which fluid for cooling the rake face flows.

According to this aspect, since the cooling path is formed in the cutting insert, the cutting insert can be efficiently cooled.

The internal cooling path may be disposed behind a region in which a chip of a workpiece comes into contact with the rake face. When the internal cooling path is disposed behind the contact region, the cooling efficiency can be increased. At least a portion of the internal cooling path may be disposed to extend parallel to the rake face behind the region.

The internal cooling path is preferably provided at a depth of less than or equal to 1.5 mm from the rake face. When the internal cooling path is provided at a depth of less than or equal to 1.5 mm from the rake face, the cooling efficiency can be increased. The cutting insert may include a thin plate member having a top surface that serves as the rake face, and the internal cooling path may be provided between the base portion and a bottom surface of the thin plate member.

A cutting tool according to another aspect of the present disclosure includes a tool body, such as a shank, a cutting insert including an internal cooling path, and a supply hole through which fluid is supplied to the internal cooling path.

REFERENCE SIGNS LIST

1 . . . cutting tool, 2 . . . shank, 2a . . . shank end portion, 2b . . . held portion, 10 . . . cutting insert, 12 . . . sheet member, 14 . . . clamp member, 20 . . . cutting edge, 22 . . . rake face, 24 . . . base portion, 30 . . . flow-path opening, 32 . . . supply hole, 40 . . . internal cooling path, 42 . . . cooling flow path, 44 . . . introduction flow path, 46 . . . discharge flow path, 48 . . . cooling flow path, 50 . . . base body, 52 . . . thin plate member.

The invention claimed is:

1. A cutting insert comprising:
a thin plate member having a top surface that serves as a rake face;
a cutting edge formed on an outer periphery of the rake face;
a base portion that supports the thin plate member; and
a plurality of internal cooling paths recessed within the base portion, through which fluid for cooling the rake face flows,
wherein the plurality of internal cooling paths are provided between the base portion and a bottom surface of the thin plate member,
wherein the entire bottom surface of the thin plate member is planar with respect to the plurality of internal cooling paths, and
wherein a plurality of flow-path openings that serve as outlets of the plurality of internal cooling paths is provided in flank faces of the base portion in a region near the cutting edge.

2. The cutting insert according to claim 1, wherein the flow-path openings are located near the cutting edge at a depth of less than or equal to 1.5 mm from the rake face.

3. The cutting insert according to claim 1, wherein the rake face has a corner, the cutting edge being provided at the corner of the rake face, and at least one of the flow-path openings is provided on an edge line of the corner formed by the flank faces in a region near the cutting edge.

4. The cutting insert according to claim 1, wherein the rake face has a corner, the cutting edge being provided at the corner of the rake face, and wherein the plurality of flow-path openings is provided in different ones of the flank faces on both sides of an edge line of the corner formed by the flank faces in a region near the cutting edge.

5. The cutting insert according to claim 1, wherein the internal cooling paths are disposed behind a region in which a chip of a workpiece comes into contact with the rake face.

6. The cutting insert according to claim 5, wherein at least a portion of the internal cooling paths is disposed to extend parallel to the rake face behind the region.

7. The cutting insert according to claim 1, wherein the cutting insert includes a thin plate member having a top surface that serves as the rake face, and wherein the internal cooling paths are provided between the base portion and a bottom surface of the thin plate member.

8. The cutting insert according to claim 7, wherein the internal cooling paths are parallel to each other, and a ratio (Wa/Wb) of a width Wa of each of the cooling paths to a distance Wb between the internal cooling paths is less than or equal to 1.

9. A cutting tool comprising:
a tool body;
the cutting insert according to claim 1 that is attached to the tool body; and
a supply hole through which the fluid is supplied to the internal cooling paths.

10. The cutting insert according to claim 1, wherein top surfaces of the plurality of internal cooling paths are flat.

\* \* \* \* \*